A. B. LANDIS.
CHANGE SPEED TRANSMISSION GEARING.
APPLICATION FILED JAN. 15, 1916. RENEWED JULY 31, 1918.

1,296,534.

Patented Mar. 4, 1919.
9 SHEETS—SHEET 2.

A. B. LANDIS.
CHANGE SPEED TRANSMISSION GEARING.
APPLICATION FILED JAN. 15, 1916. RENEWED JULY 31, 1918.

1,296,534.

Patented Mar. 4, 1919.
9 SHEETS—SHEET 3.

INVENTOR
Abraham B. Landis

WITNESSES
Harry L. Landis
A. Frank Landis

A. B. LANDIS.
CHANGE SPEED TRANSMISSION GEARING.
APPLICATION FILED JAN. 15, 1916. RENEWED JULY 31, 1918.
1,296,534.
Patented Mar. 4, 1919.
9 SHEETS—SHEET 4.
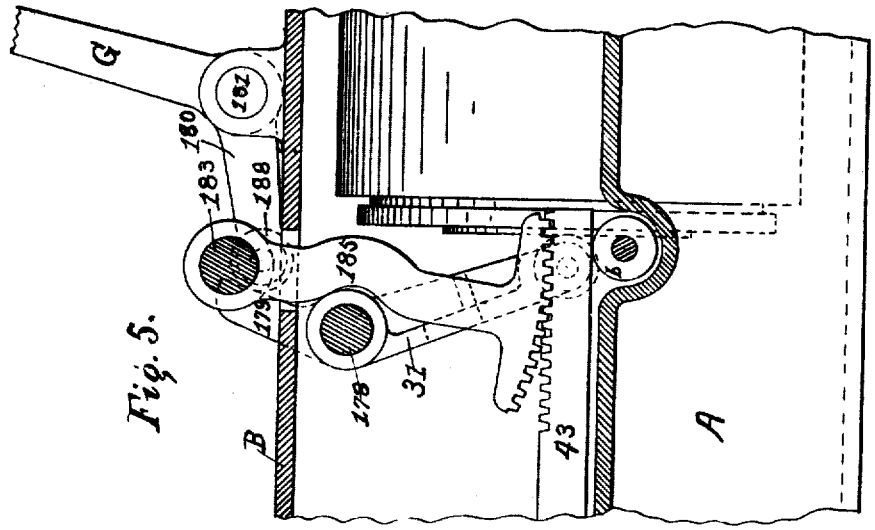
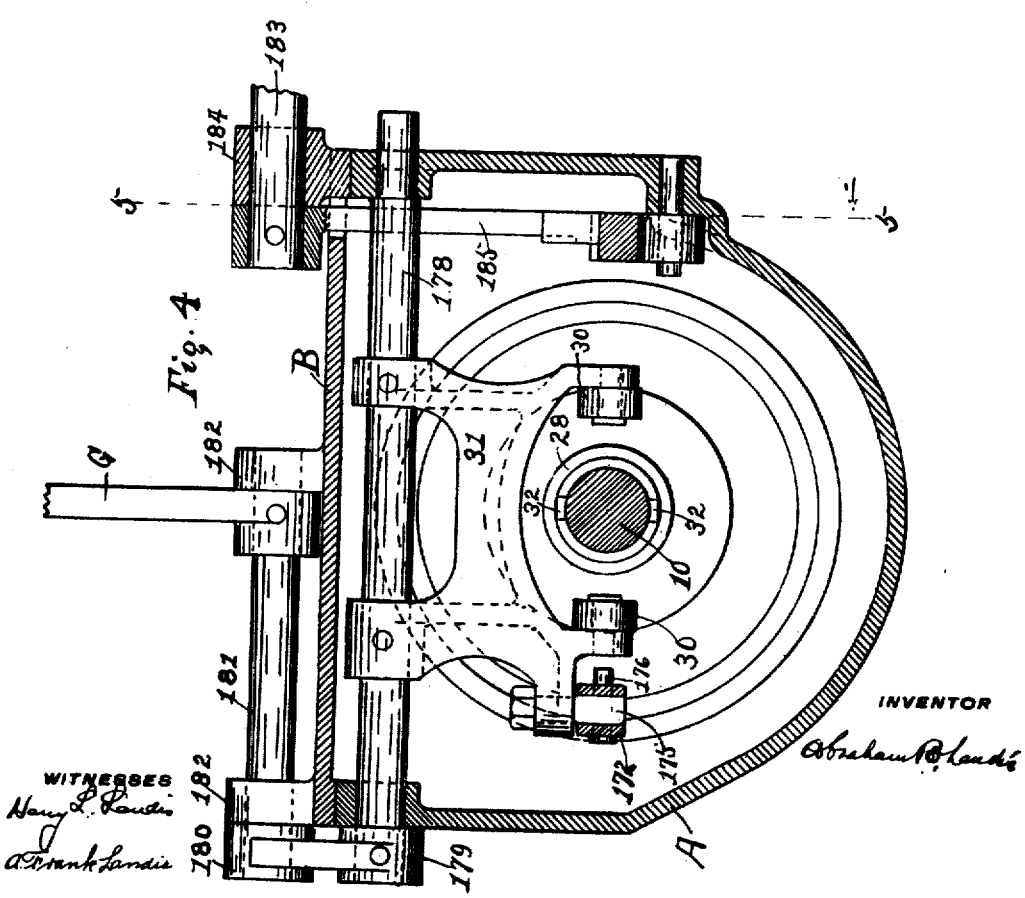
INVENTOR
Abraham B Landis
WITNESSES
Harry L. Landis
A. Frank Landis

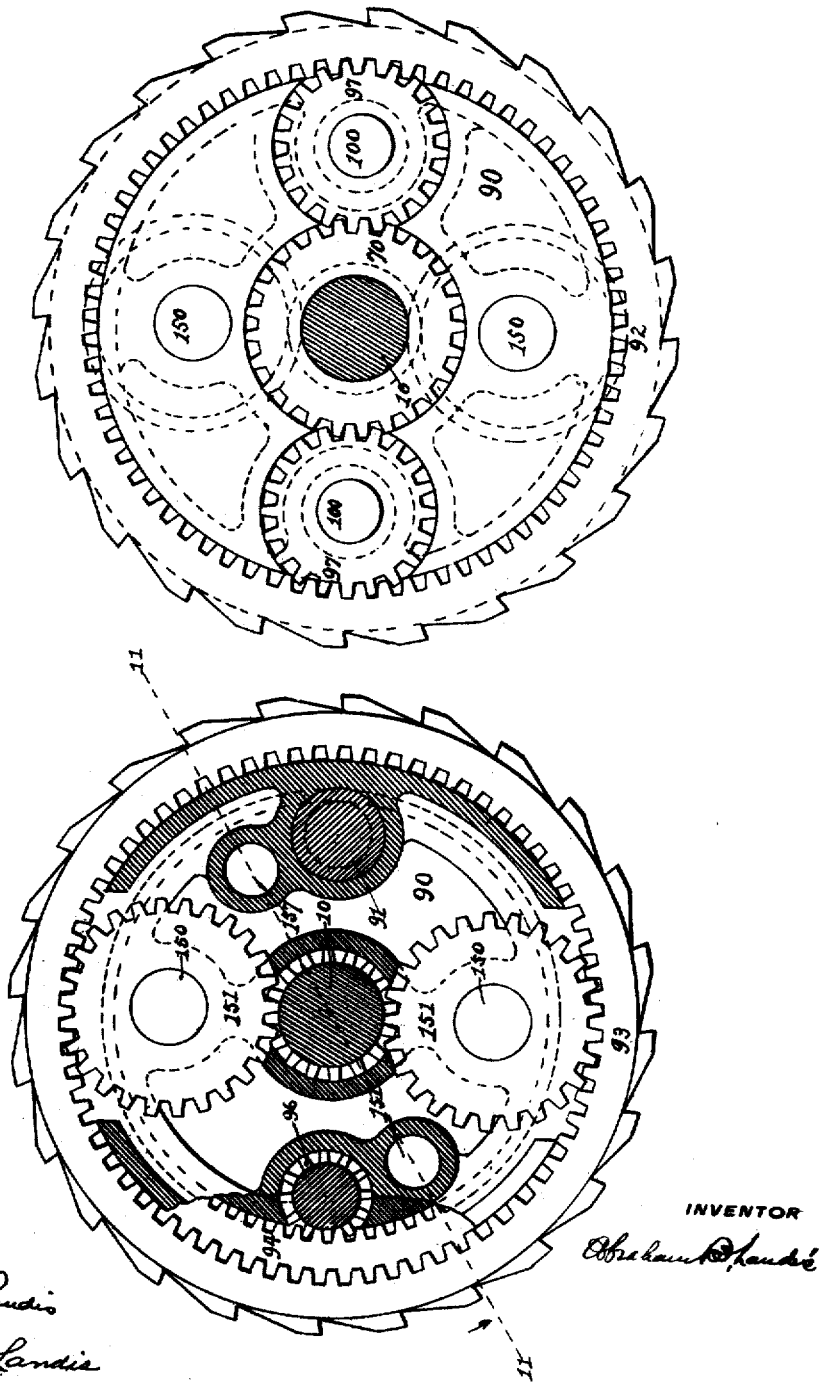

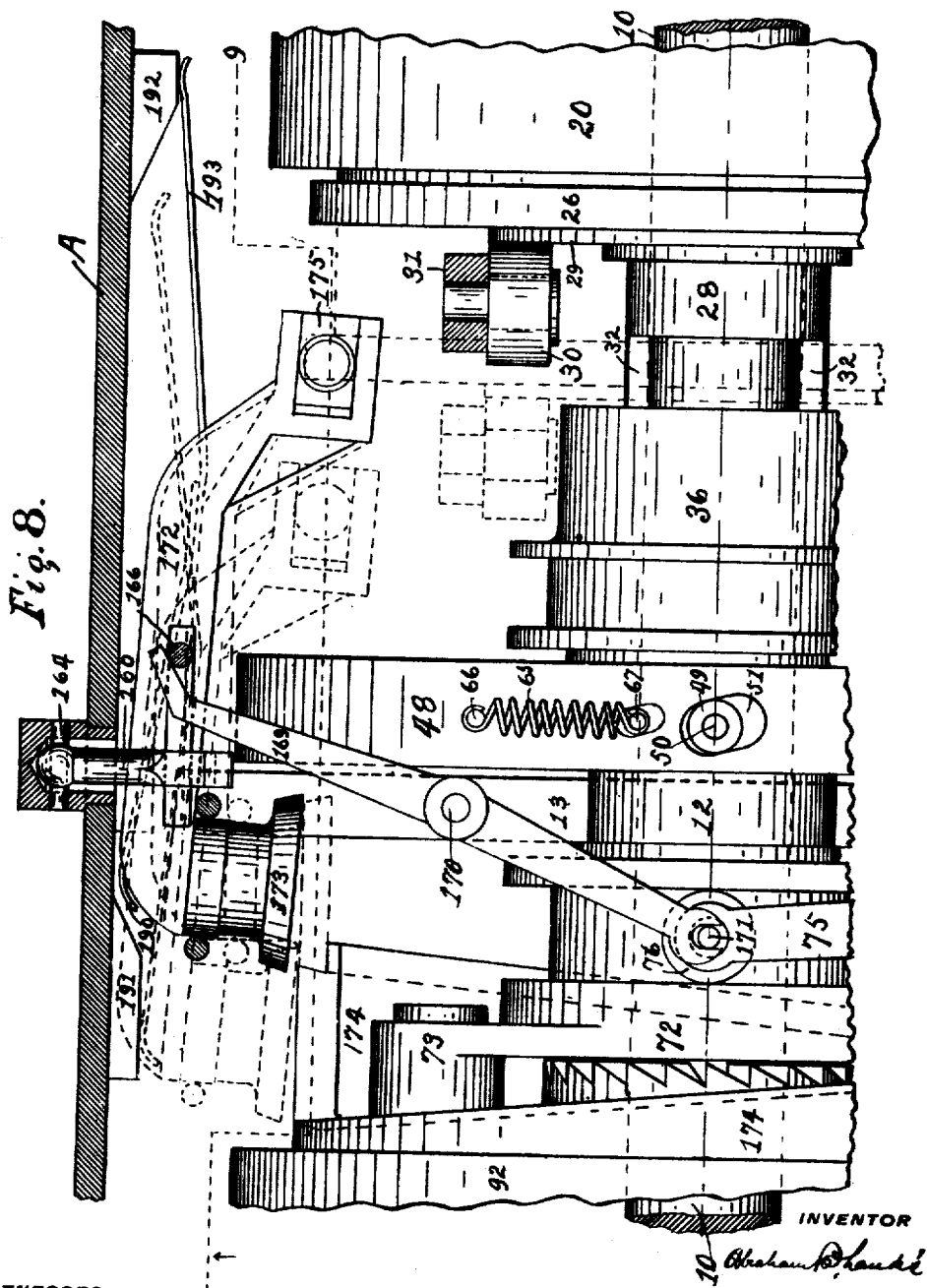

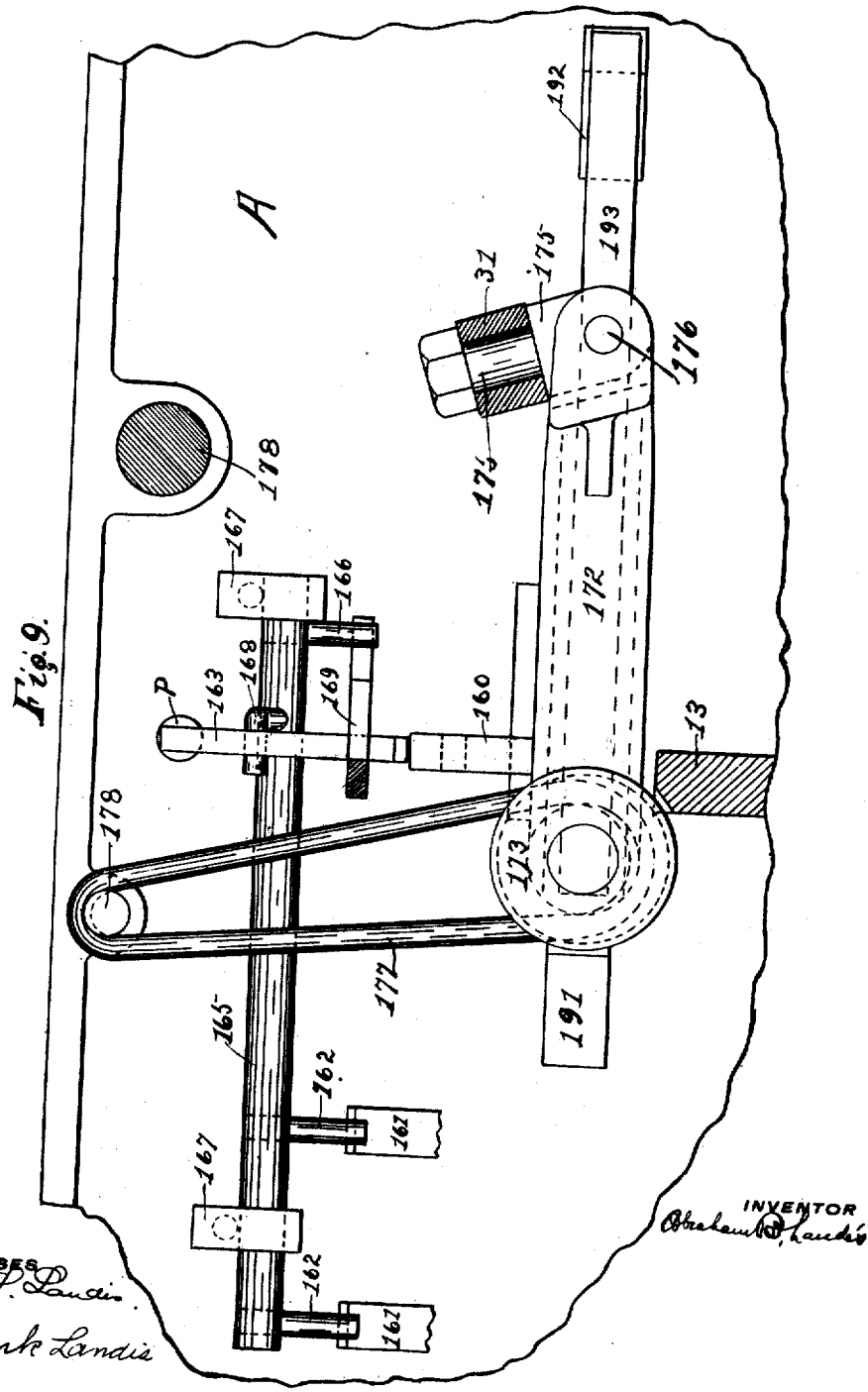

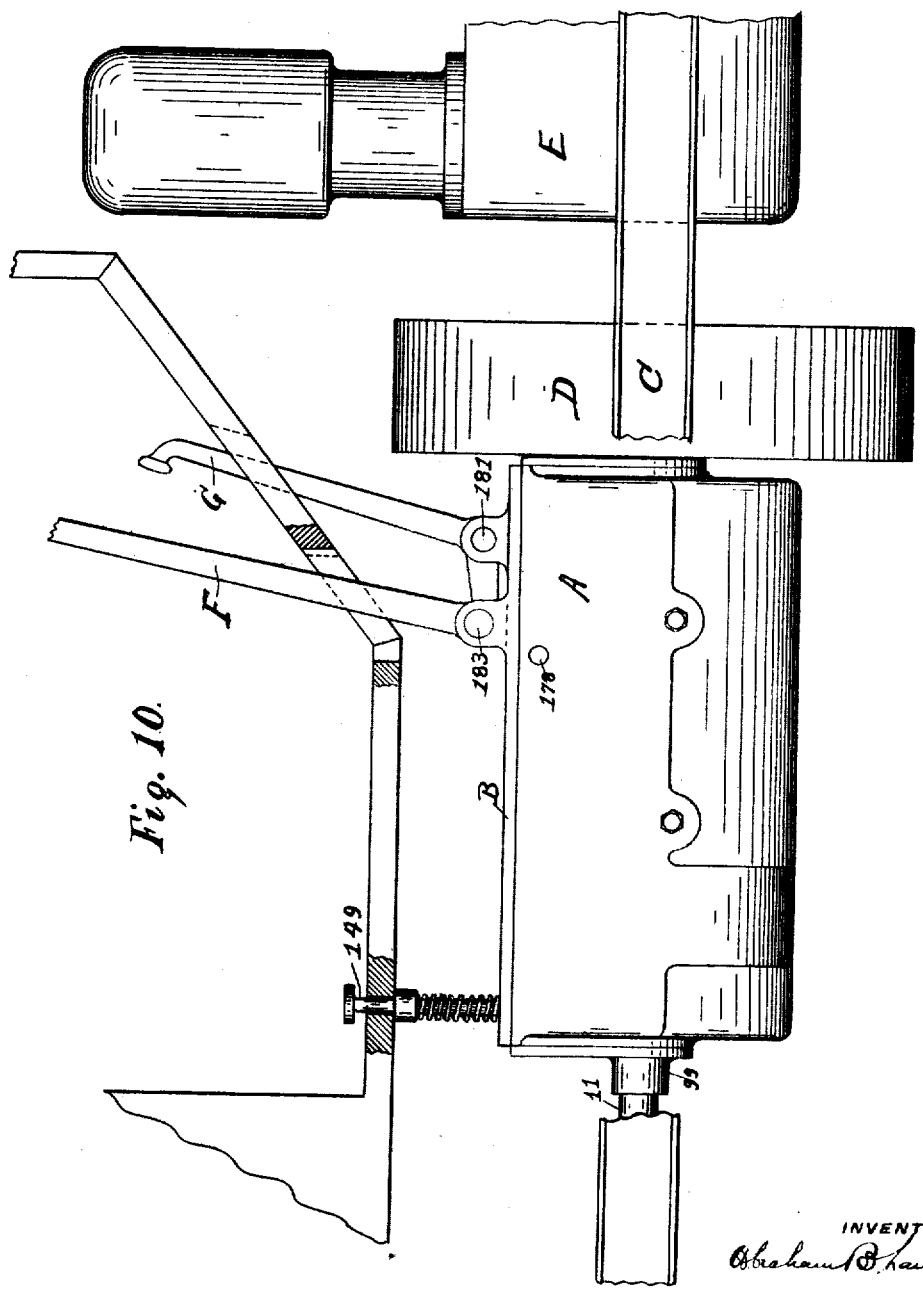

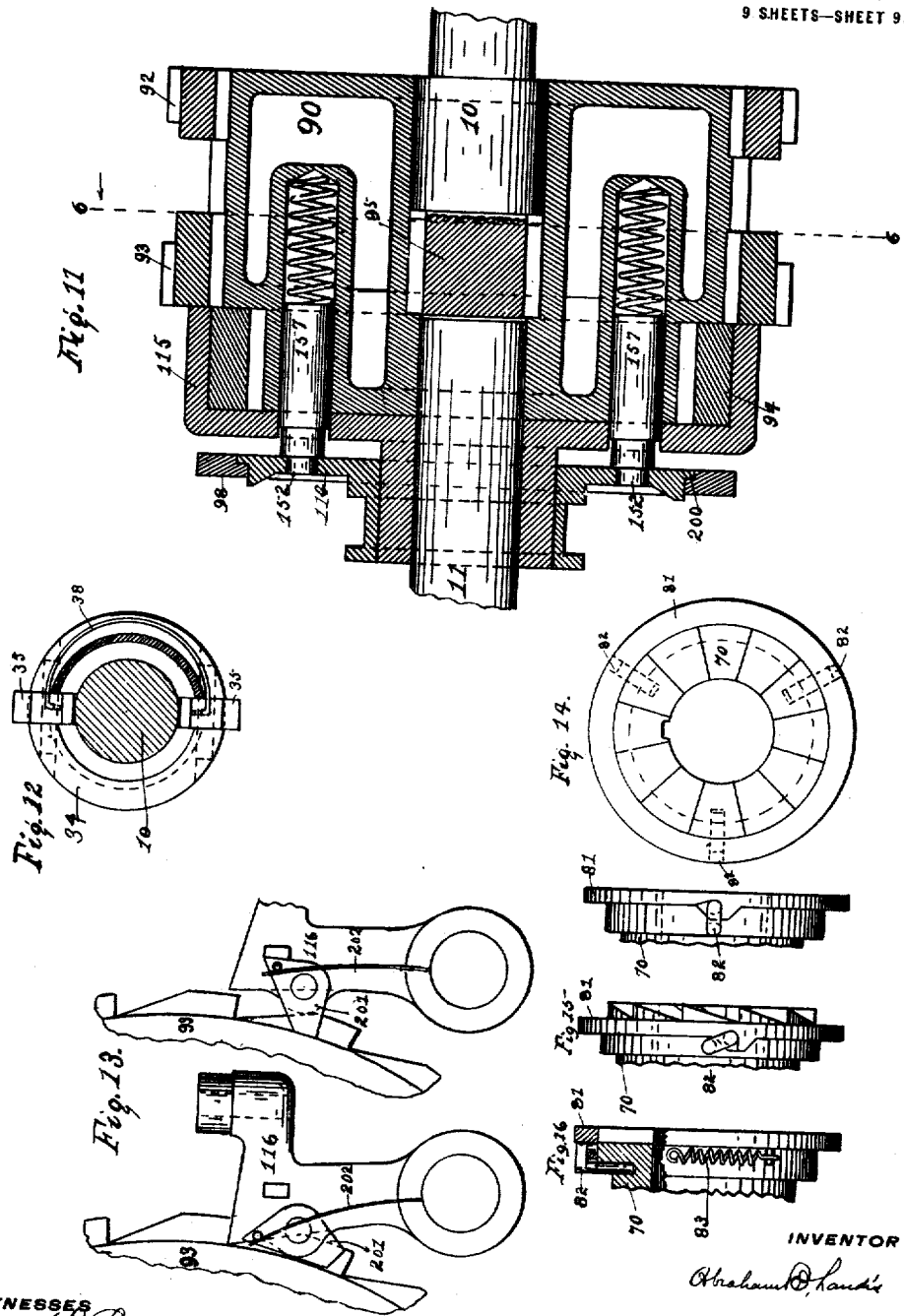

UNITED STATES PATENT OFFICE.

ABRAHAM B. LANDIS, OF ENFIELD, PENNSYLVANIA.

CHANGE-SPEED TRANSMISSION-GEARING.

1,296,534.  Specification of Letters Patent.  Patented Mar. 4, 1919.

Application filed January 15, 1916, Serial No. 72,237. Renewed July 31, 1918. Serial No. 247,673.

*To all whom it may concern:*

Be it known that I, ABRAHAM B. LANDIS, a citizen of the United States, residing at Enfield, in the county of Montgomery and State of Pennsylvania, have invented certain new and useful Improvements in Change-Speed Transmission - Gearing, of which the following is a specification.

My said invention relates to change speed transmission gearing designed especially for use in motor cars, although it can be equally well adapted for other service wherein change speed gearing is required. It consists of an improved construction whereby the change speed is effected from one speed to another by the movement of a single element with ease, and whereby the change of speed is effected without clash or shock and yet positive in its driving action. The invention has for its object the same as my pending application No. 42,188, filed July 27, 1915, with a different arrangement of gearing by which a simpler construction is secured all as will be hereinafter more fully described and claimed.

Figure 1:
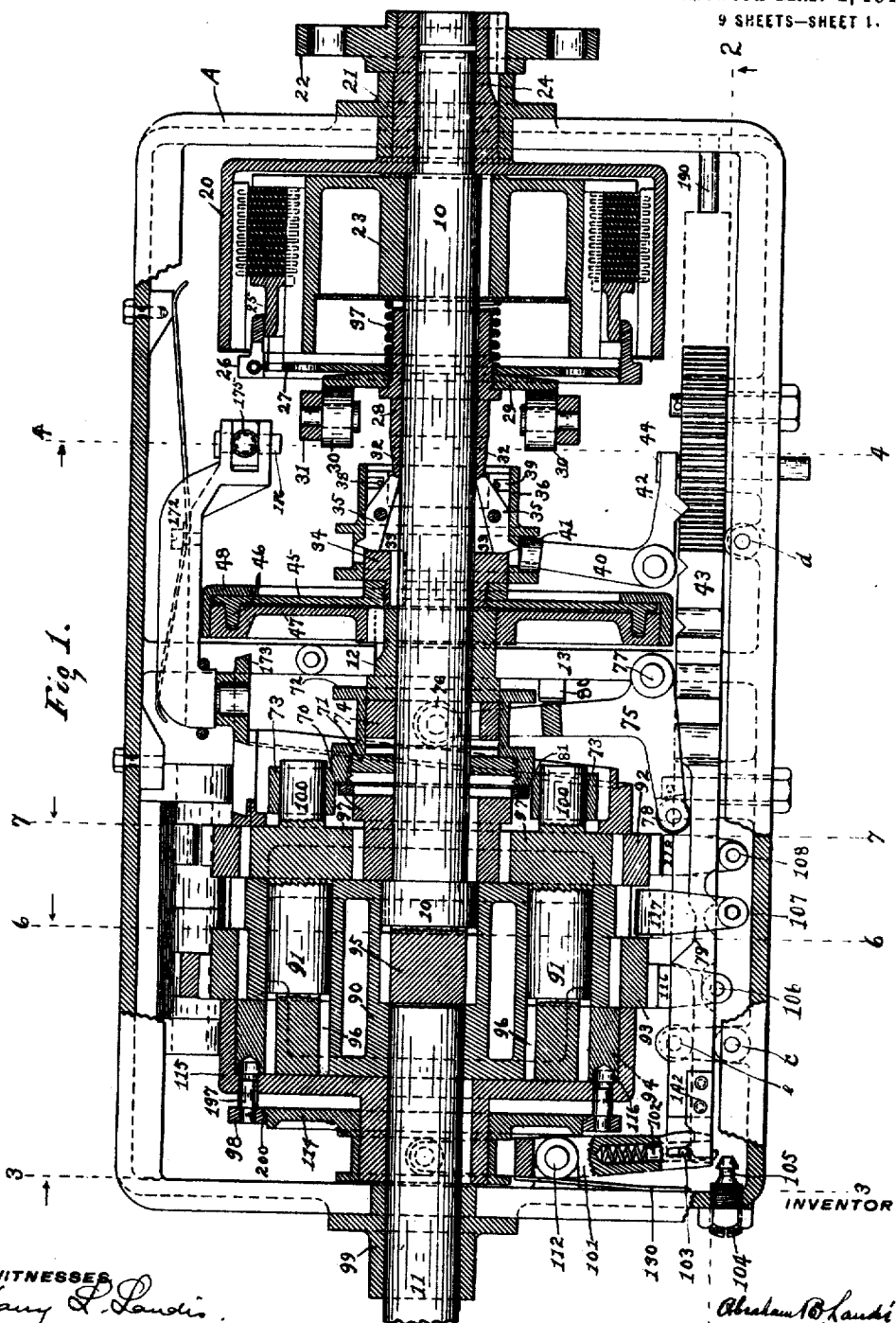
Figure 2:
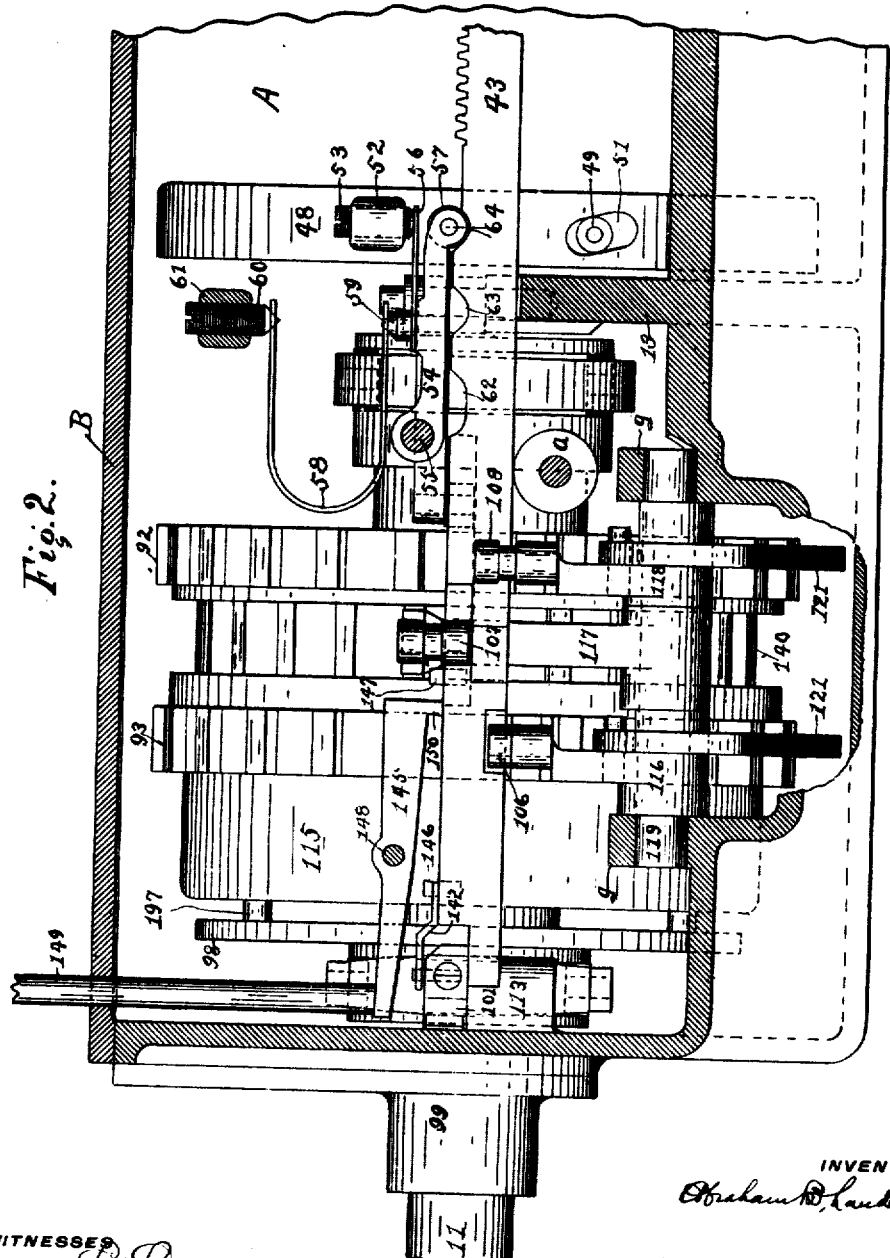
Figure 3:
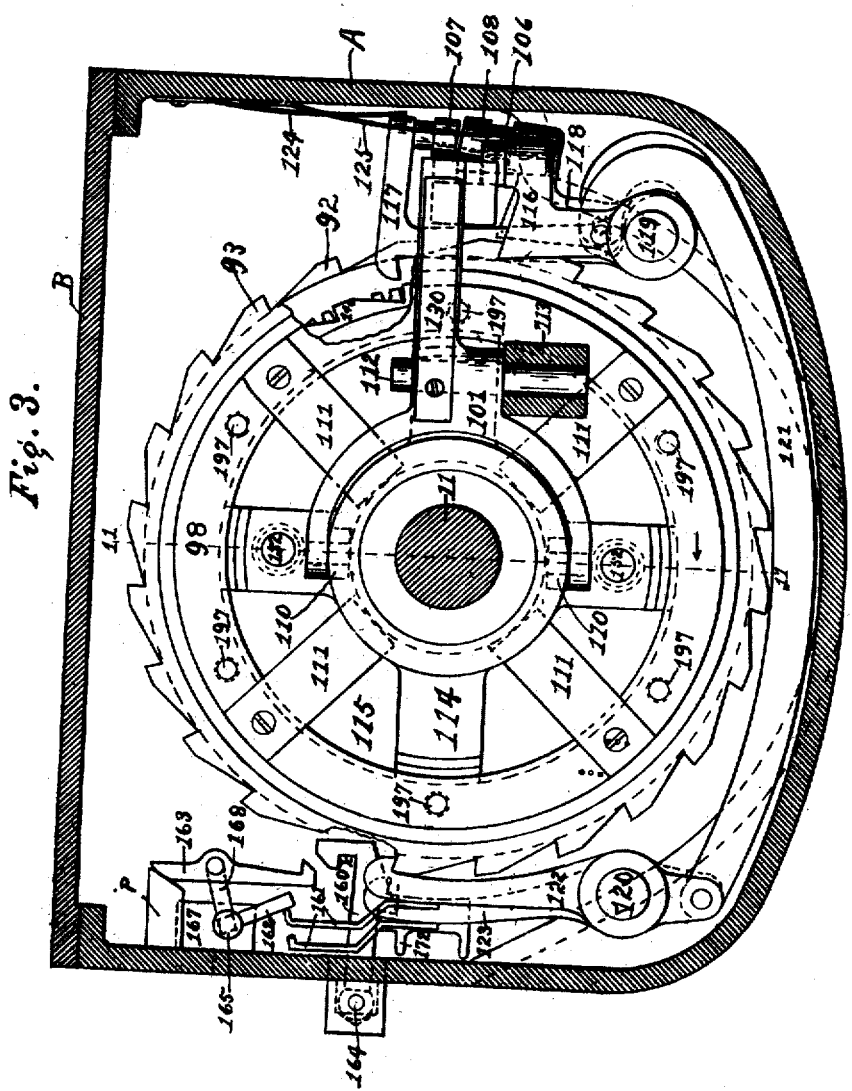

Referring to the accompanying drawings on which like reference characters indicate like or same parts, Figure 1 is a top view of the gear casing with the cover removed and the gearing therein shown in horizontal section, Fig. 2 is a vertical longitudinal section of one end of said gearing, taken on line 2—2 of Fig. 1, looking in direction of arrow, Fig. 3 is a cross section of Fig. 1 on line 3—3 looking in direction of arrow, Fig. 4 is a cross section of Fig. 1 on line 4—4 looking in direction of arrow, Fig. 5 is a longitudinal vertical section taken on line 5—5 of Fig. 4 looking in direction of arrow, Fig. 6 is a cross section of the gearing housing only, taken on line 6—6 of Fig. 1 and on line 6—6 of Fig. 11 looking in direction of arrow, Fig. 7 is a cross section of the gearing housing taken on line 7—7 of Fig. 1 looking in direction of arrow, Fig. 8 is a top view on enlarged scale showing some of the parts, Fig. 9 is a vertical longitudinal section on same scale taken on line 9—9 of Fig. 8 looking in direction of arrow, Fig. 10 is a side view of the gear shown as mounted in a motor car, Fig. 11 is a cross section of housing taken on line 11—11 of Fig. 6 and on line 11—11 of Fig. 3 looking in direction of arrow, Figs. 12, 13, 14, 15 and 16 show some minor details of clutches.

In said drawings the part marked A is the gear casing and B the cover for same inclosing the interior parts; said cover is secured to casing A by bolts not shown. C is a chassis frame of a motor car, D the motor fly wheel, E the motor, F the speed changing or operating lever, and G the foot lever for starting the car, all of which parts require little description except as they shall be referred to in describing the device.

The gearing or transmission mechanism comprises two shafts 10 and 11. Said shaft 10 is journaled at one point in a bearing 12 which is secured to a cross web 13 of casing A and at the one end journaled in a hub 24 of a frictional clutch bell 20. The hub of said clutch bell is journaled in a bearing 21 which is secured to the end of casing A by bolts not shown. The outer end of said hub has secured thereto a flange 22 which is secured to the flange of a motor shaft or source of power by any appropriate means. Secured to said shaft 10 is an inner or driven portion of a frictional clutch 23 with which the bell 20 is engaged by a plurality of frictional disks as is common in the arrangement of such frictional clutch, and as shown, 25 is a pressure ring which engages said disks and 26 is another ring which is threaded to said ring 25 and also to a disk 27 which is secured to a hub 28 slidably mounted on shaft 10. The threading of ring 26 to ring 25 is one hand of thread and 26 to disk 27 is the other hand and has for its purpose by turning ring 26 to increase or decrease the pressure on the disks as required. Disk 27 is elastic to produce a spring pressure on the frictional disks.

Disk 29 is secured with disk 27 to hub 28 as shown and is for the purpose of engagement of rollers 30, 30 on a forked lever 31 by which the frictional clutch is closed either by foot or automatically by power as will later be described. Hub 28 has projecting portions 32, 32, (see Figs. 1, 4 and 8) adapted to slide into slots 33, 33 in collar 34, said collar being secured to shaft 10 by key (not shown). In said slots of said collar 34 are pivoted dogs 35, 35. These dogs are arranged to engage the projecting portions 32, 32 for the purpose of locking the frictional clutch when engaged through the forked lever 31. 36 is a collar which slides upon collar 34 and by its engagement with the dogs 35 on beveled points on their ends the movement of the collar 36 rearwardly will depress said dogs and raise the other ends of the same which engage the projections 32 and the frictional clutch is released by a spring 37, forcing the hub 28 with its disks and pressure ring on the frictional disks rearwardly.

The frictional clutch being closed by the forked lever, either by foot power or automatically as will be described, when hub projections 32 pass the ends of dogs 35 a spring 38 in a circular recess 39 engaging both dogs, best shown in Fig. 12, forces them inwardly locking the clutch. The movement of collar 36 to release said dogs is worked by a right angled lever 40 pivoted to a boss on its underside which is part of casing A. Said lever has a detent 42 which engages with notches in a cam or controlling bar 43. By the movement of the bar the detent raising out of said notch will force the lever inward. Said lever has a roller 41 on its inner end which engages with a circumferential groove in collar 36, when said lever is moved by the movement of cam bar 43, the collar 36 is moved rearwardly and the dogs 35 are depressed and the frictional clutch is released. The lever 40 is held against bar 43 by a spring 44 which is secured to the casing A at its lower ends, so that when the notch registers with the detent the lever will move forward in position to freely allow the dogs 35 to lock the hub 28 in position when it is put there by the forked lever 31.

To the collar 34 is secured a disk 45 having an annular flange 46 with tapered sides said flange engaging with an annular groove in disk 47, said disk being secured to the bearing 12 against rotary movement but free to slide endwise on same as with a key. This disk therefore is held from rotation while disk 45 rotates. A ring 48 with flange fitting around disk 47 is arranged to bear against the side of disk 45 and is held normally to disk 47 by three rollers 49 equally divided around the circumference, mounted on pins 50 which are secured in disk 47. These rollers engage with three angular slots 51, see Fig. 8. The purpose of this mechanism is to form a brake to check or stop the motion of the driven mechanism by the frictional clutch after said clutch has been released, by means which I will here describe.

Ring 48 has a lug 52, see Fig. 2. A screw 53 is fitted in a perforation in said lug for the purpose of adjustment of the tension of said brake. A lever 54 mounted on a pivot 55 which is secured in the side of the casing A. (not shown) has a roller 57 pivoted in a bifurcated end. Said roller is arranged to engage with notches 62, 63, and 64 forming cams on the top of the cam bar 43. A steel leaf 56 forming a stiff spring is secured to the top of said lever 54. The screw 53 engages with this spring. When the cam bar is moved the roller 57 is raised out of the notch raising the lever 54 and spring 56 rotates the ring 48 and by the angular slots 51 against roller 49 serves to clamp ring 48 and disk 47 against disk 45 which with its taper groove and flange forms an effectual brake to check or stop the driven elements for the purpose as will be later described.

A spring 58 engaging a point 59 on lever 54 and another point on a screw 60 secured in a lug 61 which is part of the casing A has for its object to bring a pressure upon lever 54 forcing roller 57 into the notches 62, 63, and 64 on top of cam bar 43 which serves to insure the correct position of said bar, where it must stop at each change of speed.

A spring 65 (see Fig. 8) engaged with a pin 66 secured in ring 48 and to another pin 67 secured to disk 47 serves to draw said ring 48 back when the roller 57 on lever 54 is dropped into the notches on the cam bar 43 releasing the frictional contact.

A pinion 70 is secured to shaft 10 having a clutch face on one side of same. A sliding clutch 71 adapted to engage said clutch gear is secured within a collar 72, said collar having two lugs 73, 73 which are bored to fit two trunnions 100, 100 on gear shafts 91, 91 and which hold same against rotation with shaft 10 when not required. This clutching feature has for its object only a direct driving from driving to driven without the use of the gear mechanism. The sliding clutch 71 is clutch faced on both sides and engages by an opposite movement of collar 72 with another collar 74 secured against rotation on shaft 10. The purpose of this clutching means is to produce a driving action by the driven to the driver, useful perhaps only on motor cars, when it is desired to drive the motor by the inertia of the car, either for the purpose of starting said motor by said inertia or to use the driving of said motor by said inertia as an additional brake (if necessary) to the car when the motor has been shut off from its source of power. This feature in modern cars may not be required however where the self starters are employed and where all brakes otherwise employed are fully efficient.

The method of operating this clutch device is from the cam bar 43 through means of a forked lever 75, which has two rollers 76 engaging with a groove in collar 72 and is pivoted on a pin 77 secured to division 13 in casing A. Said lever is of angular form and has a roller 78 at its end which roller engages the inner side of cam bar 43 and becomes active when depression 79 in cam bar registers therewith when spring 80 secured to division 13 presses lever 75 and its roller 78 into this depression and moves clutch 71 through the lever 75 into engagement with the clutch gear 70. Clutch gear 70 has mounted thereon a ring 81 which is pivoted to three small rocker arms 82, best shown in Figs. 14, 15, and 16. Said rocker arms are pivoted in the clutch gear 70 with one end, and the other end in ring 81, which is adapted to bear against the face of the collar 72. It will be noted that the friction between said ring and collar will hold said rocker arm to stand at right angle to said ring, and as long as the collar 72 with its clutch 74 turns faster than 70 this ring 81 will prevent engagement of these clutches. But as soon as clutch gear which is secured to shaft 10 attains the same speed or slightly in excess, the friction between said ring 81 and collar 72 will turn said ring and the three rocker arms 82 will swing back and cause the ring 81 to recede and allow the clutch 74 in collar 72 to engage with the clutch gear 70 through the means of the forked lever 75 and its spring 80. Said clutches will disengage by clutch 74 turning faster than 70, due to the ratchet teeth, and spring 83 will hold said ring 81 to hold the rockers 82 upright holding the clutches out of engagement until the friction against said ring by opposite movement again tilts the rockers and allows the clutches to engage, as will be clear.

A housing 90 containing the change speed gearing shown in end view in Fig. 7 and in cross section in Fig. 6 and in longitudinal section in Fig. 1, is centrally bored and has its bearing on the shafts 10 and 11. Shaft 10 at this point has an integral pinion 95 the journal being partly formed with said pinion. This housing is loosely mounted on said shafts and has two bearings on opposite sides in which are journaled two planetary pinion shafts 91, 91 which have bearing in said housing their entire length including the gear teeth. These pinion shafts have trunnions 100, 100 on their outer ends and are journaled in the lugs 73 of collar 72. A pinion 97, integral with its shaft 91 fits in a recess in the outer face of said housing forming also a bearing on its teeth, best shown in Fig. 7, and engages with the clutch gear 70 which is secured to shaft 10. An internal gear ring 92 over the outside of the housing 90 is arranged to turn freely upon same, having its bearing on the teeth, also engages the planetary pinion 97.

The other end of pinion shafts 91 have pinions 96, 96 integral therewith and engage with an internal gear ring 94 which is fitted and journaled in a flanged plate 115 which is rigidly secured to shaft 11. Another internal gear ring 93 also is fitted to turn freely on the outside of the housing 90. Two studs 150, 150 are secured in opposite sides of the center of the housing at right angles to the pinion shaft 91, upon which are mounted two planetary gears 151, 151 which engage with an integral pinion 95 on shaft 10 and also engage with the gear ring 93 fitting over the housing 90. It will be noted that the gearing sets to the two gear rings are of different proportion which gives two different speeds, as each is brought into service, the operation of which will be described later. The arrangement of this gear provides for three speeds, two through the gear sets and the third by direct connection when all gears are inactive.

Gear rings 92 and 93 are provided with notches of ratchet form on their circumference as will be seen. These teeth are engaged alternately and either ring held stationary as required by pawls, preferably two of them (one on each side) so that side thrust of same upon the housing is avoided. As will be seen due to the gearing ratio of gear ring 93 by holding it, the slowest speed is attained. Freeing this ring and holding ring 92 gives the second speed, freeing both and locking clutch gear 70 and sliding clutch 71 together, 71 being secured to collar 72 which with its lugs 73 engages trunnions 100 on the planetary gear shaft 91 the entire housing is revolved giving the third or highest speed with all gearing inactive.

The pawls engaging with the gear ring 93 are 116 and 122 on opposite sides and are pivoted upon studs 119 and 120 which are secured in lugs $g$ $g$ for stud 119 shown in Fig. 2. The lugs on the opposite side for stud 120 are of same arrangement. These pawls are coupled together by a connecting rod 121 so that both pawls simultaneously connect and disconnect with the ratchet teeth of the ring 93. Pawls 116 and 118 have rollers 106 and 108 pivoted thereon. Said rollers engage with cam bar 43 which has depressions or notches allowing these pawls to engage and disengage at predetermined points by said cam bar 43. The gear ring 92 is operated or held in the same way by pawls 118 and 123.

Pawls 116 and 118 are provided with dogs 201, see Fig. 13, pivoted thereto. These dogs are arranged to hold said pawls out of engagement with the ratchet teeth of the gear rings bearing on a smooth surface on said rings, to prevent rasping of same until the movement of said ring is in the direction so as to couple and hold same and when this occurs the dog 201 tilts and as the cam bar 43 with its notches now registers with the pawl roller the spring 125 secured to casing A forces same into the ratchet teeth and holds it. This of course controls the opposite pawl 122 connected therewith in the same manner. One position in Fig. 13 shows the pawl engaged and another disengaged with the ratchet teeth showing the position of said dog 201. Spring 202 serves to hold dog 201 upright when the pawl disengages.

Between the internal gear rings 92 and 93 is formed a collar 140 on the housing in which are also cut ratchet teeth, but of the opposite hand. A single pawl 117 also pivoted upon stud 119 engages with these teeth at the predetermined time by the cam bar 43 through the roller 107 on said pawl which is forced into engagement by spring 124 secured to casing A. This pawl has for its object the holding of housing 90 stationary when required. The object for this is to produce a reverse motion of shaft 11 to that of shaft 10 for running a motor car backward, the arrangement of which I will now describe.

The flanged plate 115 has a hub thereon and is secured to shaft 11. Upon the said hub is slidably mounted a spider 114 having a grooved hub which is engaged by rollers 110, 110 on a forked lever 101. Said lever is pivoted by pin 112 to a lug 113, on casing A. The spider 114 has fitted over its arms a ring 98 and has a shoulder 200 on said arms against which said ring is pressed by springs 111. This ring has a plurality of pins 197 secured to it. Said pins register with holes in the flange plate 115 and also with holes 116 in the gear ring 94 which is fitted within said flanged plate. This has for its purpose the locking of said gear ring to said flange plate which is secured to shaft 11. This gear ring is disconnected for all forward speeds and the housing 90 is connected to the flange plate 115 by means of spring pressed pins 157 which are seated in sockets in the housing 90 said sockets registering with holes in the flange plate. Fig. 11 shows a longitudinal section through the housing and through the pins 157 and their sockets. Pins 152 in the spider 114 also register with these holes and serve to disconnect the pins 157 from the plate 115 which releases the housing from said plate. It will be noted that the pins 152 are of such length that when the spider 114 is slid on the hub of the flange plate 115 against the face of the said flange plate 115 they will come flush with the inside of said plate which make an even surface over the holes in said plate so that the spring pressed pins 157 will freely slide over same without catching. The object of this release is for the purpose of reverse or backward motion. When this housing is released from said plate the ring 94 is connected to said plate. Then by holding said housing 90 against turning by the pawl 117, through the medium of the planetary gear shafts 91 the pinion 96 integral therewith turns the flange plate through the internal gear ring secured thereto in a backward direction, the ratio of this gearing being arranged for proper speed therefor.

The coupling and uncoupling of said gear ring 94 and the housing 90 with the flange plate 115 is accomplished through the forked lever 101 which moves the spider on the hub of the flange plate moving the pins engaging the gear ring and housing as described.

The outer end of the forked lever 101 has a perforation in which is fitted a spring pressed plunger 102. Said plunger forms a latch which engages an adjustable catch 105 formed on the screw 104, seated in the casing A; said spring holding said latch in engagement. A small pin 103 attached to said plunger 102 projects through a slotted perforation in said lever and is engaged by a small cam plate 142 secured to the cam bar 43. A spring 130 on the lever 101 normally holds the spider 114 and its pins 197 out of engagement with the gear ring 94.

A stop bar 145 is pivoted to the casing A at 148 which has a catch 150 on its end and engages with pins 146 and 147 on the cam bar which form the normal limit of movement of said cam bar 43 when running at all speed in the forward motion as well as for stopped position. A rod 149 engages with the other end of said stop bar 145 and extends upward through the cover B and through the floor of an automobile, as shown in Fig. 10, having a knob on its upper end by which it can be depressed by the foot of the operator when required. A spring shown on said rod serves to raise said rod when it is released allowing the catch 150 of the stop bar to drop by gravity into the path of the pins 146 and 147. When wanting to run the car backward the rod 149 is depressed by the foot and the cam bar 43 is further moved by the lever F as it is for all changes of speed.

For the change to backward movement the stop bar 145 is raised by the rod 149 as stated, and the cam bar 43 is forced against the lever 101 moving it to its limit when the plunger latch 102 is allowed to engage the catch 105 and hold same in this position where it remains until the cam bar is moved forward, when cam 142 then presses back the plunger 102 unlatches same from the catch 105 and the spring 130 on the lever 101 withdraws the sliding spider with the ring 98 with pins 197 from engagement with the gear ring 94 and allows the lock pins 157 in the housing by its springs to engage with registering holes in the flange plate 115 which is then arranged for the forward movement again.

The flat springs 111 are secured to the ring 98 and are under tension against the inner side of the spider. The object of this is so that when the spider is moved to engage pins 197 with the gear ring 94, should the holes in said ring not register at the time of the movement of the spider and the locking of the lever 101 by the catch 105, these springs will yield and as soon as the holes in the gear ring register with said pins, said springs will immediately engage the pins with said holes. The flange 200 on the arms of the spider serve to withdraw the ring and its pins from the gear ring positively.

The extreme movement of cam bar 43 when the stop bar 145 is raised is limited by its engagement against the inner end of the case at the rear end and against the pin 190 at the forward end. The stop bar 145 is also raised when its catch comes in contact with pin 146 and it is desirable to couple the clutches 71 and 74 to allow the inertia of the car to turn the motor, either to start the motor, or to use as additional brake by driving the motor by the car when the power is cut off from same. The cam bar is then moved farther forward by its controlling lever F when the roller 78 on lever 75 is pressed inwardly beyond its normal position by a rear bevel on depression 79 on the cam bar 43 when said sliding clutch 71 in collar 72 is moved to engage the fixed clutch collar 74 on shaft 10 as will be readily understood.

The cam bar 43 is supported in position and moves on anti-friction rollers. Rollers $a$ and $b$ form an undersupport of said bar and take the pressure exerted on top of same by lever 54 with its spring 58. Rollers $c$ and $d$ take the side pressure caused by the levers 75 and 40 with their springs. Roller $e$ takes the inward side pressure of the pawl rollers 106, 107, and 108 by their actuating springs, making a free moving bar. Said cam bar 43 has rack teeth on the one end on the top as shown which is engaged by a segmental gear on a lever 185, see Figs. 4 and 5. This lever is secured to a shaft 183 journaled in a bearing 184, secured to the casing A. The other end of said shaft is journaled in a bearing on the chassis frame of a motor car, not shown. On said shaft 183 is secured the controlling lever F which extends upward to within easy reach of the operator as shown in Fig. 10 by which said cam bar is moved from one extreme to the other, the various stop positions being controlled, as before stated, by the roller 57 in the notches on top of said bar by the pressure of the spring 58.

The frictional clutch is automatically engaged by the rotary motion of the housing 90 and is actuated by the engagement of the pawl 116 when the first or lowest speed is being connected. When the pawl 116 is allowed to drop into the ratchet teeth of gear ring 93 the opposite pawl 122 also engages which engages the gearing for this speed. On this pawl is secured part 161 which engages with an arm 162 secured to a small shaft 165 journaled in bearing 167 secured to casing A. To said shaft is secured another arm 168 having a right angled bend. On this right angled bend is pivoted a bar 163 having a hook on its lower end. When said pawl 122 disengages with the gear ring 93 it allows shaft 167 to turn either by the gravity of bar 163 or some convenient spring of approved form (not shown) and brings the bar 163 down and hooks into notch $x$ on a lower arm 160. This arm is pivoted at 164 as shown and has a hook on its lower side which engaged with a flange on a bar 172 holding same outwardly for the purpose as will presently be described.

When the next pawl 123 engages with the gear ring 92 for the next speed its movement will again turn shaft 165 in the opposite direction and raise the hooked bar 163 lifting the arm 160 and disengaging its hook beneath from the bar 172 held outward. In its movement the upper end of the hooked bar 163 comes in contact with a bevel pin P which causes said bar to unhook from said arm 160 and allows it immediately to drop so as to catch the flange on part 172 when it again returns to its outward position, as is more clearly shown in Fig. 8.

On the inner face of the housing 90 is secured a cam 174 to produce a movement equal to that required for opening and closing the frictional clutch. On bar 172 which is pivotally secured to the forked lever 31 to move both ways by a swivel 175 and a pin 176. On the other end is mounted an anti-friction roller 173 which is brought into engagement with said cam when required. When the arm 160 having a hook beneath unlatches from bar 172, the spring 190 which will then, in the position shown by dotted lines in Fig. 8, be bearing upon the cam block 191 which is secured to casing A, which being then under tension, will force this bar 182 inwardly and cause the anti-friction roller 173 to come into the path of and engage with cam 174 which will force the forked lever 31 with its anti-friction rollers 30 against flange 29 and therefore the pressure ring 25 against the frictional disks of the clutch, closing same, when instantly the dogs 35 by their spring 38 will lock said position against the projecting arms 32 of collar 28 as before described.

As soon as cam 174 passes off and the anti-friction roller 173, which is the position shown in full lines in Fig. 8, the spring 193 which is secured to bar 172 being now under tension due to its passing up on cam block 192 immediately throws same outwardly and the hooked arm 160 resting on same latches same in the position as shown in Fig. 8 and in full lines of bar 172 in Fig. 3. The dotted line of this part shows its position after the frictional clutch has been released and been thrown open to the full extent by the spring 37. This fully explains how the closing of the clutch is automatically accomplished.

The automatic actuation for the first and second speeds is controlled as stated from the pawls 122 and 123. For the highest speed, or direct drive, it is actuated by the movement of the collar 72 in which is the clutch 71. When said clutch is allowed to engage with the gear clutch 70 the arm 169 which engages at one end with a pin 171 on the lever 75 and pivots on a pin 170 secured to division 13 of casing A by the movement of lever 75 the other end which has an angular end moves and engages with an arm 166 which is similar to arms 167 and moves the same, turning the shaft 165 to which it is secured in the same manner as with extensions from the pawls 122 and 123 operating to automatically closing the frictional clutch in the same manner.

When starting the car the motor being in motion the foot lever G is used. This lever is shown in Figs. 4, 5, and 10 and is secured to a shaft 181 which is journaled in bearings 182, 182 on the cover B of the casing A. The outer end of said shaft has an arm 180 secured thereto. The outer end of said arm 180 has an anti-friction roller 188 which engages with an arm 179 secured to a cross shaft 178 journaled in the casing A. On this shaft is secured the forked arm or lever 31 which with its anti-friction rollers 30, 30 bears against the flange 29 of the frictional clutch. By a pressure upon this lever G the clutch is closed without much effort since its power upon said clutch increases as it closes due to the position of the arm 180 with its anti-friction roller 188 with the arm 179, causing an increased leverage.

Having now fully described the construction and arrangement of the working parts of the transmission, I will now describe its operation. The gear as shown in all the different drawings is set for the first or slowest speed (this construction being with three speeds) and the frictional clutch locked for operation. However when the car or the driven element is stopped the frictional clutch is released although the gearing engagement for the slow speed remains the same. When the car is running at this slowest speed and it is wanted stopped, the lever F is moved forward moving the cam bar 43 back to the extreme against the stop pin against stop bar 145, the detent 42 on lever 40 is lifted out of the notch of the cam bar unlocking the clutch. In starting the car the foot lever G is pressed which closes the clutch, but it will not lock until the lever F is drawn back to the position for first speed when the dogs 35 will lock the clutch the foot pressure being retained until said lever has been moved. Simply moving the hand lever F to first position when the car is stopped, will not start it nor if moved to any other position will it start, until the car is first started by the foot lever frictional clutch control. This manner of starting allows of a very gentle start as any pressure can be given to the clutch desired and with ease.

When the car is started on the first speed the next speed is attained by simply moving the lever F to the next position which is readily felt by the position controlling roller in the notches on top of the cam bar. The operation then is as follows: Immediately when the lever F is moved the cam bar unlocks the frictional clutch and by spring 37 is instantly fully released, the frictional brake described clamps and checks or stops the motion of the driven element and when the cam bar has been fully moved to the next position and the driven elements checked the notch controlling the pawl to engage the gear rings on the housing are allowed to engage without clash or shock. The frictional clutch can never be engaged automatically until said pawls are engaged, thus avoiding any danger of clash making a smooth change from one speed to another. Then through the means described the frictional clutch is again engaged automatically all with but a single easy movement of one lever. The same operation again ensues in changing to the next or highest speed. In this case however the clutch is automatically engaged through the movement of the clutch on shaft 10 and through levers as described. In returning from the highest speeds to lower speeds the operations are the same. The gear can be used progressively and selectively. The lever F can be moved for highest speed in starting the car if condition warrant this and is desired, by simply pressing the foot lever G when the car will start at that speed and the clutch will automatically lock, or the second speed can be so used. The gear will work equally well at all speeds to all speeds and to a stop, by a simple movement of the lever F to the desired position.

When reversing to run the car backward. the knob on top of the rod coming up through the foot board is depressed which will allow the lever F to move farther forward which will change the gearing connections releasing the pawl to the gear ring on the outside of the housing, locking the housing to the casing and reversing the movement of the driven shaft, the said housing being unlocked from said driven shaft and the gear ring in the flange plate secured with said driven shaft being locked to said flange as has been fully described. In the case of the backward movement of the car the foot pedal closing the frictional clutch only can be used. The clutch cannot be locked for this movement as the running backward is little used and safety is guaranteed by not locking same. The whole of these operations are fully controlled by the car bar which is operated by lever F and the operation is done with ease, safety, and desirability.

It will be obvious that this construction could be made with more or less speeds by constructing same with more or less change speed gears to meet the case. Three speeds however with the flexibility of the device are sufficient for all practical purposes.

Having now described my said invention what I claim is new and desire to secure by Letters Patent is:

1. A change speed gearing comprising a casing, two shafts in alinement with each other, a frictional clutch, one of said shafts having a driven clutch member of said frictional clutch secured thereon coupling with a driving clutch member connected with the source of power, said shaft having a frictional brake thereon to check or stop its motion when said frictional clutch has been released, a revoluble housing on said shaft, change speed gearing mounted on said housing, means to connect said housing with the other of said shafts through said change speed gearing, substantially as specified.

2. A change speed gearing comprising a casing, two shafts journaled in said casing, a frictional clutch, the driven clutch part secured to one of said shafts, the driving clutch part connected with the source of power, means for releasing said clutch, means on said shaft to check or stop its motion when the frictional clutch has been released, a revoluble housing mounted on said shaft, one or more sets of change speed gears mounted on said housing, means for connecting said two shafts alternately through said series of change speed gears on said housing, means by which through the movement of a single element all of the said actions are consecutively accomplished, substantinally as specified.

3. A change speed gearing comprising a casing, two shafts in alinement journaled in said casing, a revoluble housing, change speed gearing mounted in said housing, means for positively and alternately coupling the first driven of said shafts to said housing and said speed gearing, and means for coupling and uncoupling said housing with the other shaft, substantially as set forth.

4. A change speed gearing comprising a casing, two shafts in alinement journaled in said casing, a revoluble housing loosely mounted on said shafts, change speed gearing mounted in said housing, an internal gear a part of said change speed gears encircling said housing, a means for holding said internal gear with said casing, means for positively and alternately connecting and disconnecting said housing and said change speed gears with one of said shafts, means for positively connecting and disconnecting said housing to other of said shafts, substantially as specified.

5. A change speed gearing comprising two shafts in alinement, a revoluble housing loosely mounted on said shafts, change speed gearing in said housing, a frictional clutch connecting the first driven of said shafts with the source of power, means on said shaft to check or stop its motion when the frictional clutch is released, means for coupling and uncoupling said shaft to said housing, means for coupling and uncoupling said housing with the second driven shaft and means for resetting the frictional clutch, substantially as specified.

6. A change speed gearing comprising two shafts in alinement, a frictional clutch connecting one of said shafts with the source of power, a revoluble housing loosely mounted on said shaft, a change speed gearing mounted in said housing, means on said shaft for checking or stopping its motion and means for coupling said housing positively with said shaft, means by which the coupling of said housing through the change speed gears actuates means which automatically resets said frictional clutch, substantially as specified.

7. A change speed gearing comprising two shafts in alinement, a frictional clutch connecting one of said shafts with the source of power, a revoluble housing loosely mounted on said shaft, change speed gearing mounted in said housing, means to couple and uncouple said housing with said shaft, a sliding cam bar by which said means are actuated, means for securing the correct position of said bar for the different speeds and means for moving said cam bar, substantially as specified.

8. A change speed gearing comprising a casing, two shafts in alinement journaled therein, a revoluble housing, change speed gears mounted in said housing, an internal gear ring, a part of said change speed gear encircling said housing, a pawl secured to said casing by which said gear ring may be held stationary, a cam bar, means on said cam bar for controlling said pawl, and means for moving said cam bar, substantially as set forth.

9. A change speed gearing comprising a casing, two shafts in alinement journaled therein, a revoluble housing loosely mounted on one of said shafts, change speed gearing mounted in said housing, means for connecting and disconnecting said housing with the first driven of said shafts, a flange plate secured to the second driven of said shafts, a gear ring in said flange plate, means for coupling and uncoupling said gear ring with said flange plate and means for coupling and uncoupling said housing with said flange plate, substantially as set forth.

10. A change speed gearing comprising a casing, two shafts in alinement journaled in said casing, a revoluble housing, change speed gearing mounted in said housing, means for connecting and disconnecting said change speed gearing with one of said shafts, means for locking said housing to said casing holding it stationary, a flanged plate secured to the last driven shaft, a gear ring on said flange plate, means for coupling said gear ring with said flange plate and means for uncoupling said housing from said last named shaft, substantially as set forth.

11. A change speed gearing comprising a casing, two shafts in alinement journaled therein, a frictional coupling connecting the first driven of said shafts to the source of power, a revoluble housing loosely mounted upon the said first driven shaft, a change speed gearing mounted in said housing, means to couple and uncouple said housing from the said first driven shaft, and means to connect and disconnect the shaft with housing through said change speed gearing, a cam on said housing carried by said first driven shaft, means through which said cam resets the frictional clutch, substantially as specified.

12. A change speed gearing comprising a casing, two shafts in alinement journaled therein, a frictional clutch connecting the first driven of said shafts with the source of power, a frictional brake on said last named shaft for checking or stopping its motion when said frictional clutch has been released, change speed gears in said housing, means for coupling said shafts through the change speed gears on said housing, a cam secured to said housing and means through which said cam automatically resets said frictional clutch after any of the change speed connections have been made, substantially as specified.

13. A change speed gearing comprising a casing, a frictional clutch, two shafts, the driven of said shafts connected with the source of power by said frictional clutch, a frictional brake on said shaft, a revoluble housing loosely mounted on said shaft, change speed gears mounted on said housing, means for engaging the driving action through the change speed gears with said second driven shaft, a cam on said housing for closing the said frictional clutch, means by which through one movement of a single element said frictional clutch is released, said frictional brake is applied, said shaft motion is checked or stopped, one of said change speed gears is disengaged and another set engaged, means by which said engagement actuates, means by which the friction clutch is reset, substantially as specified.

14. A change speed gearing comprising a casing, two shafts in alinement journaled therein, a frictional clutch coupling the first driven said shafts to the source of power, means on said first driven shaft to check or stop the motion thereof automatically when the said frictional clutch has been released, a revoluble housing loosely mounted on said shaft, change speed gearing mounted in said housing, means for engaging any of the change speed gearing with said first driven shaft, means by which any of the change speed gearing by their engagement with the said shaft brings means into action which automatically closes or sets the said frictional clutch, substantially as set forth.

15. A change speed gearing comprising a revoluble housing mounted upon a shaft, change speed gears contained in said housing, a frictional clutch coupling said shaft to the source of power, means for releasing said frictional clutch, means therewith for checking or stopping the motion of said shaft, means for engaging for power transmission any of the change speed gears, while said shaft is checked or stopped and means for automatically closing or setting said frictional clutch, substantially as specified.

16. A change speed gearing comprising a shaft, a revoluble housing mounted upon said shaft, change speed elements contained in said housing, a clutch connecting the said shaft with the source of power, a bar having a series of cams thereon, means for releasing said clutch by the movement of said cam bar, means for checking or stopping the motion of said shaft by the movement of said cam bar, means for disengaging from driving action one of said change speed elements in said housing, means for engaging another of said change speed elements by said cam bar while the speed of said shaft is checked or stopped and means for resetting the said clutch by rotary motion of the driven parts, substantially as set forth.

17. A change speed gearing comprising a casing, a shaft journaled in said casing, a revoluble housing loosely mounted on said shaft, change speed elements on said housing, a frictional clutch coupling said shaft to the source of power, a gear ring on the periphery of said housing, said gear ring being part of said speed change elements, means for holding said gear ring to said casing for producing motion through the change speed element, a cam bar, means for controlling the said means for holding the gear ring by the movement of said cam bar, means for releasing the frictional clutch, means for checking or stopping the motion of said shaft by a brake mechanism, all of said means actuated by a single movement of said cam bar and means for resetting the clutch, substantially as set forth.

18. A change speed gearing comprising a revoluble housing mounted upon a shaft, change speed elements mounted in said housing, a frictional clutch connecting said shaft with source of power, a cam bar, means by which a single movement of said cam bar releases said clutch, checks the motion of said shaft through a brake mechanism, disengages and engages one of the change speed elements, means by which said frictional clutch is automatically closed or reset by the power from the driven elements through the engagement of said change speed elements, and means by which said bar is moved, substantially as specified.

19. A change speed gearing comprising a casing, a shaft journaled in said casing, a revoluble housing loosely mounted upon said shaft, change speed elements on said housing, a frictional clutch coupling said shaft to the source of power, a gear ring on the periphery of said housing, said gear ring being part of said speed change elements, means for holding said gear ring to said casing for producing the motion through the change speed element, a cam bar, means by which the movement of said cam bar releases the said frictional clutch, checks or stops the motion of said shaft through a brake mechanism and means which reset the said clutch, substantially as specified.

20. A change speed gearing comprising a casing, two shafts in alinement journaled in said casing, a housing loosely mounted on said shafts, change speed elements mounted in said housing, a frictional clutch coupling one of said shafts to the source of power, means for holding said housing stationary with the casing, an internal gear ring mounted loosely on a flange plate secured to the other of said two shafts, means for temporarily securing said gear to said plate, and means for disconnecting said housing from said last named shaft whereby the motion of said last named shaft is reversed, substantially as specified.

21. A change speed gearing comprising a shaft, a revoluble housing mounted upon said shaft, speed elements mounted in said housing, a frictional clutch coupling said shaft to the source of power, means consisting of a sliding clutch on said shaft by which said housing is coupled direct therewith, means by which the change speed elements are put out of action, means by which the opposite movement said sliding clutch is made to engage another fixed clutch upon said shaft, causing the driven element to become the driver of the driving element, as when wanting to turn the motor by the inertia of the driven element, substantially as specified.

22. A change speed gearing comprising a revoluble housing mounted upon a shaft, change speed elements contained in said housing, a frictional clutch coupling said shaft to its source of power, a bar having a series of cams thereon, means for releasing said frictional clutch by the movement of said bar, means for changing from one change speed to another by the movement of said bar, means for resetting said clutch by the rotary motion of the driven element controlled by means of said bar, a stop bar arranged to be depressed with the foot, means to allow said cam bar to be moved to a further position by depressing said stop bar to effect a reverse motion of the last driven shaft of the gearing, substantially as set forth.

23. A change speed gearing comprising a casing, a revoluble housing mounted upon a shaft journaled in said casing, speed change elements mounted in said housing, a frictional clutch coupling said shaft with the source of power, a lever secured to a shaft journaled in said casing, means by which said clutch can be closed by the movement of said lever by foot pressure, means by which the same can be automatically closed by the rotary motion of the driven elements through means of a cam secured to said lever which engages the frictional clutch, a cam bar, means upon which said bar acts by which the said friction clutch is disengaged, the motion of said shaft is checked or stopped through a brake mechanism, the driving action changed from one speed element to another and automatically reëngages said frictional clutch by the power in the elements, substantially as specified.

24. A change speed gearing comprising a housing mounted upon a shaft journaled in a casing, speed change elements mounted in said housing, a frictional clutch coupling said shaft with the source of power, a cam bar, means secured to said shaft comprising a collar having locking dogs to hold said frictional clutch in engagement, means by which said dogs are moved to unlock said clutch by, through the movement of said cam bar, means by which the movement of said cam bar releases said clutch, means by which through a single movement of said cam bar operates means to check or stop said shaft by a brake mechanism after the release of said clutch, means for changing the driving action from one of the speed change elements to another and means to automatically reëngage said frictional clutch, substantially as specified.

25. A change speed gearing comprising a casing, two shafts journaled in said casing, a revoluble housing loosely mounted on said shafts, speed change elements mounted in said housing, a frictional clutch engaging one of said shafts with the source of power, means for coupling and uncoupling said speed change elements with said shafts, means for coupling said housing to the other of said shafts, a lever pivoted to the casing, a cam bar, means by which said cam bar opertes said lever, to actuate means to couple said last named shaft to the speed change element by which said shaft is reversed, substantially as specified.

26. A change speed gearing comprising a casing, two shafts in alinement journaled in said casing, the first driven of said shafts coupled to the source of power by a frictional clutch, a housing on said shafts, speed change elements in said housing, a cam bar, a single movement of said cam bar releases the frictional clutch, changes from one speed element to another for various speeds, actuates means which prevents clash or shock in the change of speeds and automatically resets the frictional clutch, substantially as specified.

27. A change speed gearing comprising a first driven element, a frictional clutch connecting said element to the source of power, change speed elements mounted on said first driven element, a second change speed driven element connecting with said first driven element through the change speed elements, means by which through the movement of a single element different means are made effective to consecutively release said frictional clutch, check or stop said first driven element by a brake mechanism, change engagement from one said speed element to another and automatically reëngage or reset said frictional clutch, substantially as specified.

28. A change speed gearing comprising a first driven element, a frictional clutch connecting said element to the source of power, change speed elements carried on said first driven element, a second driven element connecting with said first driven element through the said change speed elements, means by which through one movement of a single element different means are made effective to consecutively release said frictional clutch, check or stop the motion of said first driven element by a brake mechanism, and change engagement from one speed element to another and reëngages the frictional clutch, substantially as set forth.

29. A change speed gearing comprising a first driven element, a frictional clutch connecting said element to the source of power, change speed elements carried on said first driven element, a second driven element connecting with said first driven element through the said change speed elements, means by which through a single movement of an element different means are made effective to consecutively release said frictional clutch, check or stop the motion of said first driven element by a brake mechanism, and change engagement from one speed element to another, substantially as specified.

In testimony whereof I have affixed my signature in the presence of two witnesses.

ABRAHAM B. LANDIS.

Witnesses:
C. A. HUNSBERGER,
J. HERBERT LOWNES.

Copies of this patent may be obtained for five cents each, by addressing the "Commissioner of Patents, Washington, D. C."